United States Patent [19]
Rodgers

[11] 3,896,004
[45] July 22, 1975

[54] DISTILLATION SYSTEM UTILIZING A MICROPOROUS STACK

[75] Inventor: Franklin A. Rodgers, Brookline, Mass.

[73] Assignee: Polaroid Corporation, Cambridge, Mass.

[22] Filed: Dec. 22, 1972

[21] Appl. No.: 317,623

[52] U.S. Cl. ............... 202/167; 202/176; 202/202; 202/206; 202/236; 203/11; 203/50; 203/89; 159/DIG. 27; 159/DIG. 31

[51] Int. Cl. ....... B01d 3/00; B01d 3/42; B01d 3/08; B01d 3/10

[58] Field of Search ............ 202/167, 176, 177–182, 202/192, 193, 205, 206; 203/4, 10, 11; 159/DIG. 16

[56] References Cited
UNITED STATES PATENTS

| | | | |
|---|---|---|---|
| 851,045 | 4/1907 | Ullrick | 202/176 X |
| 2,368,665 | 2/1945 | Kohman et al | 159/24 R |
| 3,119,352 | 1/1964 | Checkovich | 202/173 X |
| 3,152,053 | 10/1964 | Lynam | 202/173 |
| 3,163,587 | 12/1964 | Champe | 202/176 |
| 3,340,186 | 9/1967 | Weyl | 159/DIG. 27 |
| 3,406,096 | 10/1968 | Rodgers | 159/Dlg. 27 |
| 3,454,470 | 7/1969 | Guarino | 202/177 |
| 3,476,654 | 11/1969 | Sieder | 203/7 |
| 3,477,917 | 11/1969 | Rodgers | 203/10 |
| 3,563,860 | 2/1971 | Henderyckx | 203/10 |
| 3,630,854 | 12/1971 | Huhta-Koivisto et al | 202/173 X |
| 3,650,905 | 3/1972 | Rodgers | 203/10 |
| 3,672,959 | 6/1972 | Sweet | 202/181 |

*Primary Examiner*—Jack Sofer
*Attorney, Agent, or Firm*—Michael Bard; John W. Ericson

[57] ABSTRACT

A compact home distillation system for use with a disposable multi-stage still of the type comprising alternating vapor permeable and impermeable membranes in laminar stacked relation for receiving distilland on one side of each of said permeable membranes and condensing distillate on the other side of each of said permeable membranes and including a water supply means and a combination heating, deaerating, and pH control distilland treatment device. The system further includes a priming pump, a storage container for potable product water, and means for cooling the water in the storage container.

13 Claims, 7 Drawing Figures

DISTILLATION SYSTEM UTILIZING A MICROPOROUS STACK

BACKGROUND OF THE INVENTION

This application relates to a novel system for recovering a purified solvent from a mixture of such solvent with one or more solutes or, alternately, for the recovery of a solution of increased solute concentration from a mixture of solvent and solute of lower concentration. The novel system herein described includes distillation apparatus incorporating microporous membranes and is particularly adapted for the recovery of potable water from brackish or saline water.

A number of U.S. patents and copending applications disclose distilation systems and processes particularly adapted to demineralization, e.g., desalination, of water in which a feed or distilland liquid such brackish or salt water is circulated in contact with one side of a microporous membrane permeable to the vapor of the liquid and impermeable to the liquid itself under the operating conditions. A distillate liquid, e.g., distilled water, is maintained in contact with the opposite side of the membrane. Heat is transferred to the distilland liquid to vaporize it while heat is transferred from the distillate liquid to cause the vapor of the liquid to pass through the membrane and be condensed as distillate.

Multiple-stage distillation systems are described in which the heat from the distillate of each stage is transferred to the distilland of a succeeding stage and so forth. In systems of this type, several permeable membranes or sections thereof are arranged in stacked relation with alternating barriers which cooperate to form channels on opposite sides of each membrane for distilland and distillate liquids. Distillation systems as above mentioned are described in U.S. Pat. Nos. 3,406,096, 3,477,917, 3,497,423, 3,340,186, 3,650,905, 3,661,721, and in copending application Ser. No. 80,570, filed Oct. 14, 1970, by Franklin A. Rodgers.

A preferred embodiment of the distillation apparatus disclosed in some of the aforementioned patents and application includes a multiple-stage distillation unit in which both the microporous membranes and the spacers are formed of polymeric materials, the spacers being in the form of thin films. Suitable materials for the membranes are those which lend themselves to the formation of microporous membranes having a high proportion of voids, e.g., 70 to 80 percent, and have uniform pore distribution and which are inherently poorly wettable or non-wettable, e.g., hydrophobic, by the distillate liquid or can be treated to render them poorly wettable or non-wettable by the liquid. Examples of polymers particularly adapted to the formation of membranes useful in water desalination are disclosed in the aforementioned patents and application and include the fluorocarbons such as polytetrafluoroethylene and polyvinylidene fluoride which are preferred because they are inherently poorly wettable by water. Methods of manufacturing microporous membranes of this type are known in the art and include solvent-non-solvent systems such as disclosed, for example, in U.S. Pat. No. 3,642,668, issued to Bailey et al. on Feb. 15, 1972.

Polymeric materials useful as the barrier films are selected according to criteria including compatibility with the liquids involved, costs, ease of fabrication and assembly, useful operating temperatures and thermal conductivity. Polymers particularly suitable for water desalination include polycarbonates, polyesters, polyethylene, polypropylene, and halogenated polyethylenes, particularly the fluorocarbons.

In a distillation system of this type, the barrier films or vapor impermeable membranes are corrugated to provide channels for the flow of distillate and distilland liquids in contact with opposite sides of porous membranes which are secured to adjacent barrier films in selected regions, particularly at the edges of the porous membranes and/or barrier films, to control the circulation of the liquids and confine the liquids to their proper channels.

In a typical distillation system such as disclosed in the aforementioned patents and application, the membrane and barrier films are rectangular and stacked with their edges in alignment and secured to one another adjacent their edges to form a rectangular-shape unit. This unit comprising the membranes and films is coupled with an external means for introducing liquids into and withdrawing liquids from the heat unit, means for trannsferring heat to the unit, and means for transferring heat from the unit.

To conduct particular liquids to selected channels within the unit, aligned holes are provided through the stacked membranes and films and a selected channel is blocked in regions surrounding the aligned holes in the membrane and film defining said channel in order to prevent the flow of liquid into or from the selected channel through the holes in the membrane and film. The external means for introducing into and withdrawing liquids from the unit, as well as transferring heat to and from the unit, generally comprise a pair of plates or headers. The stack of membranes and films comprising the unit are engaged between the headers and liquid conduit means, such as manifolds, are coupled with the holes in the outer films of the unit for introducing and withdrawing liquid means (for heating one of the headers and means for cooling the other header). Thus, a still of this type constructed according to the prior art comprises a unit formed of stacked membranes and films enclosed at least on two sides by heating and cooling elements as well as liquid conducting means for coupling holes in the unit with external accessories such as circulating pumps, etc.

SUMMARY OF THE INVENTION

The present invention provides a complete distillation system and may, by way of example, find particular utility in the recovery of potable water from brackish water. The system is particularly compact and is suitable for use on or under a counter adjacent to a water supply and drain such as found in the normal kitchen. The system includes a shut-off valve which can connect to a cold water supply line and which is, in turn, connected through a fine screen filter (which functions to remove large sediment) to a pressure reducer and flow control which function to provide a regulated supply of cold water through the passages in a still such as described hereinabove to a novel combination water treatment device such as described in copending application Ser. No. 317,622 filed on even date herewith. The cold water from the still is heated and deaerated in the combination treatment device which is further provided with means for controlling the pH of the heated water to prevent scale formation.

The heated and deaerated feed is then sent to the still from which potable water is extracted. The potable water is conducted to a product storage device, the underside of which is microporous and permits the passage of water vapor out of the product storage device but which will pass neither liquid water nor air. Means are provided for circulating air over the bottom surface of the product storage container so as to enhance the cooling of the product by evaporation through the semipermeable lower surface.

The unit is provided with a connection to the sink drain and excess cold supply water as well as the distilland waste are permitted to pass down the drain.

The system is provided with a pump and appropriate check valves to permit air to be drawn out of the product passages and membrane pores and permit heated and deaerated feed water to fill the supply passages and contact the microporous membranes of the still. In addition to controlling the pH of the heated water supply, means are provided for altering the rate at which the pH may be caused to vary in accordance with U.S. papatent application Ser. No. 317,653, filed on even date herewith.

In consequence of the foregoing, it is an object of this invention to provide a relatively simple and inexpensive distillation system suitable for use in the home to provide potable water from a non-potable supply.

Another object of the present invention is to provide a compact distillation system for home use capable of economically and efficiently providing potable water from a non-potable supply.

It is a further object of this invention to provide a self-contained, under- or over-the-counter distillation system for connection to the cold water supply and drain systems of a common kitchen sink having self-contained means for heating and deaerating the cold water supply and cooling the product water.

A still further object of the present invention resides in the provision of a compact, efficient, and relatively simple system for distilling a solution of solute and solvent to yield both a purified solvent and a solution in which the solute concentration is increased.

DESCRIPTION OF THE DRAWINGS

Other objects and many of the attendant advantages of the instant invention will be better appreciated and said invention will become clearly understood by reference to the following detailed description when considered in conjunction with the accompanying drawings illustrating one embodiment of the subject invention, wherein.

Figure 1:
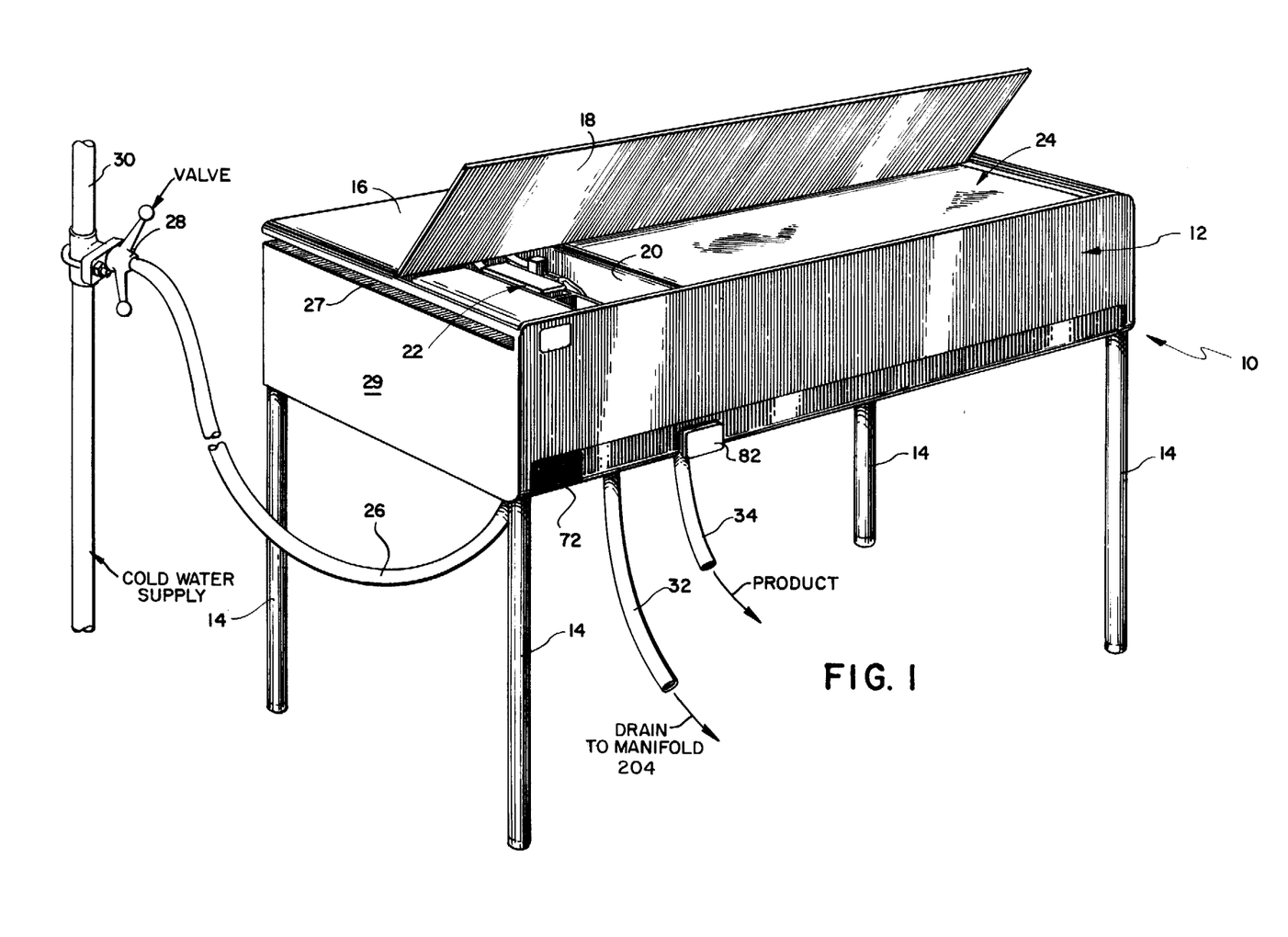
FIG. 1 provides a simplified perspective of the subject invention.

Referring to the drawings in more detail, and more particularly to FIG. 1, the novel distillation system of the subject invention is illustrated generally at 10 and is seen to include a generally rectangular housing 12 mounted on supporting means comprising a plurality of legs 14. The upper face 16 of the housing 12 is provided with a hinged cover portion 18 which opens to permit access to the interior of the housing 12. The interior of the housing 12 is divided by a partition 20 into a processing area 22 and a product storage area 24.

Figure 5:
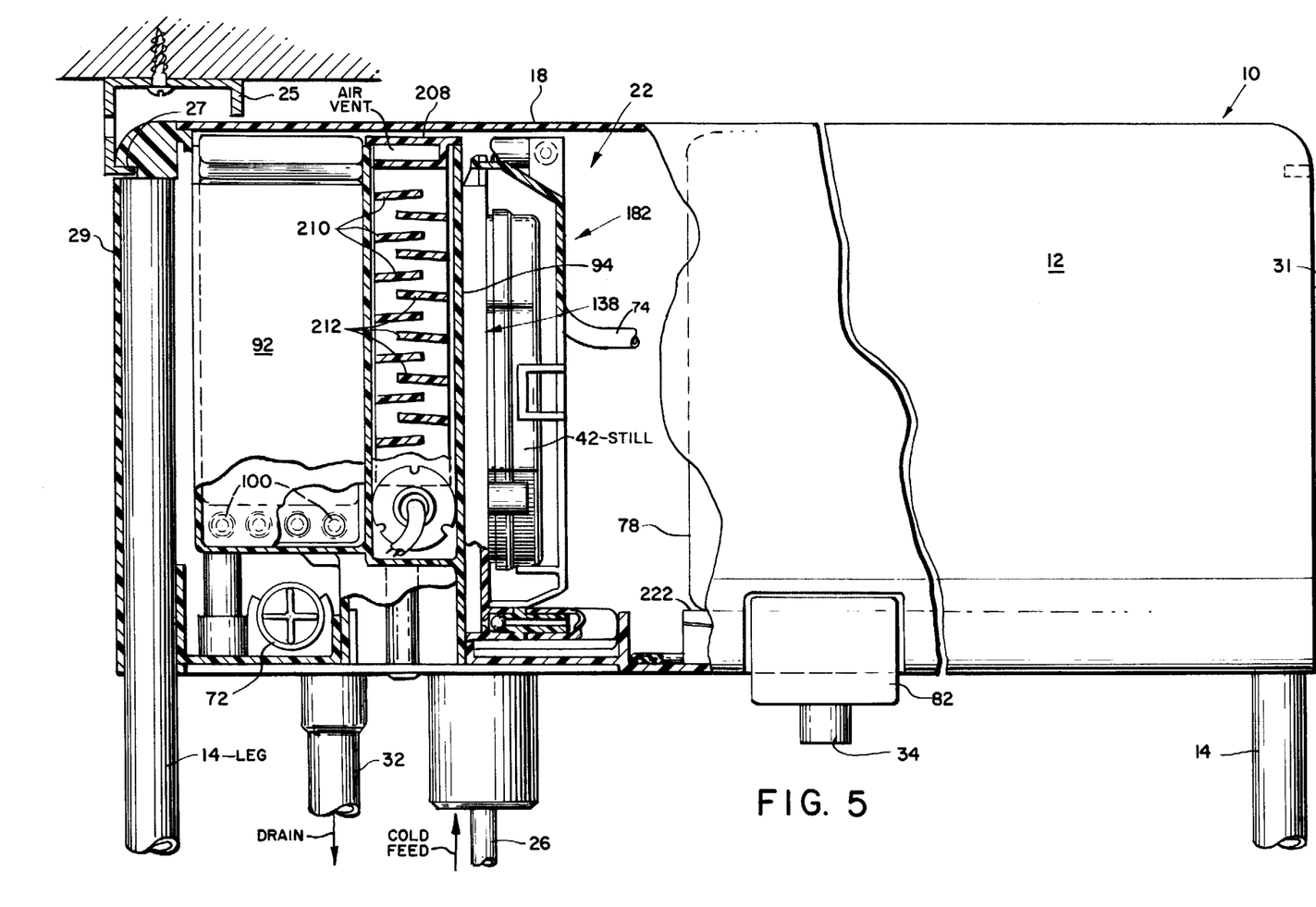
FIG. 5 provides a partial broken away front elevation of the apparatus of FIG. 1 with a portion of the distilland treatment device shown partly in section.

The distillation system 10 is adapted to be mounted on a kitchen counter top adjacent the cold water and drain lines of the kitchen sink or, alternately, the distillation system 10 may be mounted under the kitchen counter, as by brackets 25 which are slideably received within slots 27 in opposite side walls 29 and 31 of the housing 12, as best seen in FIG. 5.

The distillation system 10 is provided with a water supply line 26 which extends from the interior of the processing area 22 to a line piercing valve 28 of a well-known type which is adapted to connect to a cold water supply line 30 of the kitchen sink (not shown). The distillation system 10 is additionally provided with a drain line 32 which extends into the processing area 22 and is adapted to connect to the kitchen sink drain (not shown). The distillation system 10 is further provided wwith a product output line 34 which extends into the product storage area 24 and through which potable water may be extracted from the system 10.

Referring again to FIG. 2, the distillation system 10 is seen to include a fine screen filter 36 which is connected to the line piercing valve 28 and functions to screen out all undesired particles in the cold water supply which are larger than, say, 70 microns. The fine screen filter 36 is of a variety well known in the art and typically includes a replaceable screen element (not shown).

Inasmuch as the common cold water supply from a kitchen sink is under a pressure on the order of 80 psig., and because such line pressure fluctuates considerably, a well-known type of single-stage pressure reducer 38 is connected to the output of the fine screen filter 36 and provides a regulated output pressure of approximately 5 psig. A flow control valve 40, which may typically comprise a relatively long small diameter pipe, is connected at one end to the output of the single-stage pressure reducer 38 and at its other end to the cold water input of a still 42 of the multi-stage type (wherein several microporous membranes are arranged in stacked relation with alternating non-permeable barrier membranes which cooperate to form channels on opposite sides of each microporous membrane for distilland and distillate liquids) such as described hereinabove and more fully described in my copending application Ser. No. 317,624, filed on even date and commonly assigned herewith.

Figures 2, 2A:
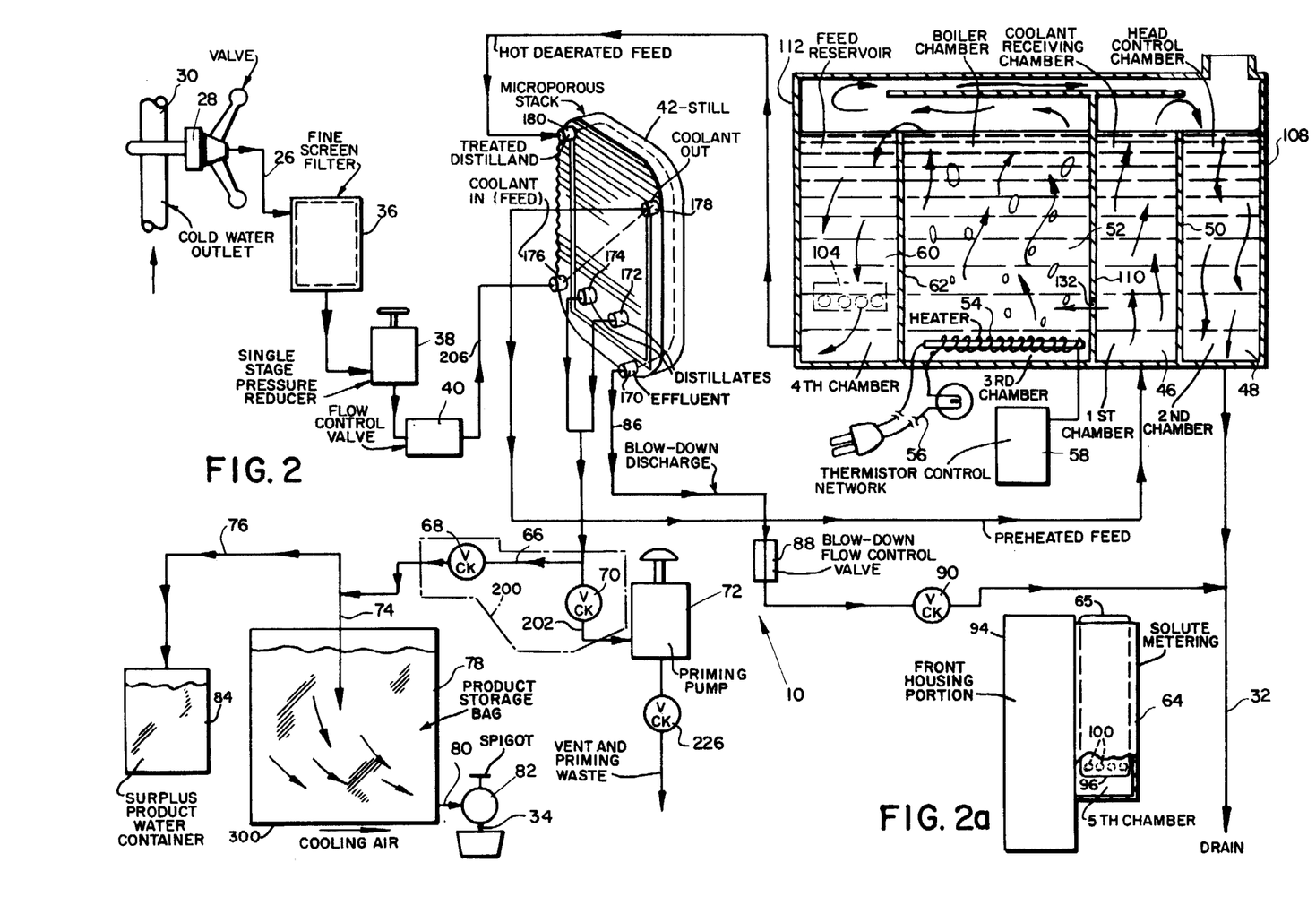
FIG. 2 provides a simplified functional schematic of the subject invention.
FIG. 2a provides a diagrammatic detail of a portion of the distilland treatment device of FIG. 2.
Figure 3:
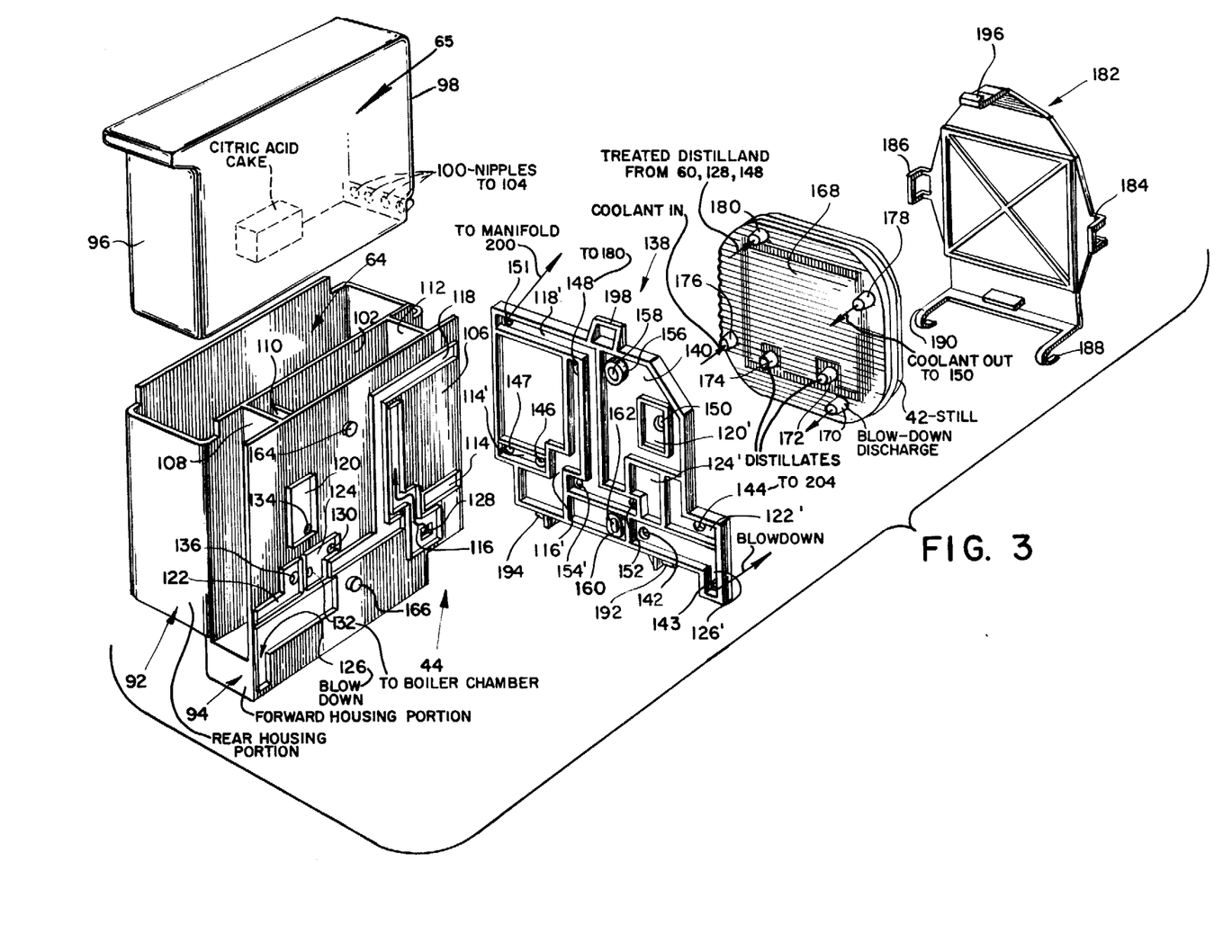
FIG. 3 provides an exploded perspective of the novel distilland treatment device and still of the subject invention.

The still 42 is connected to and receives treated feed water from a novel boiler-deaerator and distilland treatment device more fully described in copending applications Ser. No. 317,622, filed on even date and commonly assigned herewith, illustrated generally at 44 (FIG. 3). The combination distilland treatment device 44 is seen to include a first chamber 46 (FIG. 2) receives cold water from the still 42. The first chamber 46 is separated from a second chamber 48 by a partition 50 of predetermined height so that water from the first chamber 46 will overflow the partition 50 into the second chamber 48, thereby maintaining the liquid level or pressure head in the combination distilland treatment device 44 at the height of the partition 50. The second chamber 48 is connected through the drain line 32 (which functions as a common drain for the distillation system 10) to the sink drain (not shown) thereby preventing the second chamber 48 from filling above the height of the partition 50.

The combination distilland treatment device 44 is provided with a third or boiler chamber 52 the lower portion of which communicates with the first chamber 46 (as described in more detail hereinafter) to receive cold feed water therefrom. An electric heating element 54 is disposed within the bottom portion of the boiler chamber 52 in a well-known manner and is provided with a cord and plug assembly 56 for connection to a common 110 volt power supply (not shown). The heating element 54 is controlled by a common thermistor control network 58 for safety and extended still life. Should the water supply fail and the boiler chamber 52 run dry, the control network 58 will sense an overheating condition and turn the heating element 54 off. Similarly, a power failure of a duration that would allow the water in the boiler chamber 52 to cool below, e.g., 140° F, would be sensed and the heating element 54 would be shut down until normal start-up procedures were followed again, as detailed hereinafter.

The combination distilland or water treatment device 44 is provided with a fourth chamber 60 which is separated from the boiler chamber 52 by a partition 62 of the same height as the partition 50 and over which heated and deaerated water from the boiler chamber 52 flows into the fourth chamber 60 which functions as a distilland or feed water reservoir. The feed water reservoir or fourth chamber 60 is provided with an opening which communicates with a fifth chamber 64 (as best illustrated in FIGS. 2a and 3) which incorporates a solute metering mechanism 65 FIG. 2a and controls the pH of the heated feed water in the reservoir 60 via the opening therebetween, as more fully described in copending application Ser. No. 317,653, aforesaid. The fourth chamber or reservoir 60 (FIG. 2) communicates with the still 42 in a manner more fully described infra to provide heated, deaerated, and treated feed water thereto. The vapor of the heated and treated feed water is permitted to pass through the pores of the microporous membranes in the still 42 where it is cooled and condensed by the cold water circulating through the still 42 from the flow control valve 40, which circulating cold water is fed from the still 42 to the first chamber 46.

The vapor of othe treated and the feed water which passes through the microporous membranes and is cooled as aforesaid condenses to form the potable product water and flows through product water channels (not shown) in the still 42 and through a conduit means 66 to a pair of check valves 68 and 70 which are connected in parallel to the conduit means 66. The check valves 68 and 70 permit water to flow through them in one direction only with the check valve 70 being connected between the product water conduit means 66 and a priming pump 72, and the check valve 68 being connected between the product water conduit means 66 and the junction of a pair of parallel product water conduit means 74 and 76.

The product water conduit means 74 provides the input to a product storage bag 78 which is provided with an output conduit means 80 which connects to a flow control valve or spigot 82 which, in turn, is connected to the product output line 34 from which the potable water is extracted. The conduit means 76 functions as an overflow line and conducts surplus product water to a surplus product water container 84 in the event that product water is permitted to build up at a faster rate than it is withdrawn from the product storage bag 78

As the heated and treated feed water or distilland is circulated through the still 42 and the solvent or distillate is drawn of as potable product water, the solute concentration of the distilland is increased. The distilland with the increased solute concentration comprises the effluent in the distillation process and it is drawn off from the still 42 as blow-down via a blow-down discharge conduit 86. The blow-down discharge conduit 86 connects to one end of a blow-down flow control valve 88 (similar to the flow control valve 40) and the output of the flow control valve 88 is connected through a check valve 90 to the drain line 32. The check valve 90, of course, functions to ensure that the blow-down may only flow toward the common drain line 32 and to permit proper start-up of the unit to be achieved, as indicated hereinafter.

Referring again to FIG. 3 in more detail, the combination distilland treatment device 44 is seen to include a rear housing portion 92 and a forward housing portion 94. The rear housing portion 92 encloses the fifth chamber 64 which is adapted to receive a solute container 96 which forms a part of the solute metering mechanism 65. The solute container 96 is in the general shape of a rectangular parallelepiped and may typically incorporate cakes of citric acid (not shown) therewithin. The container 96 is formed with an end wall 98 incorporating a plurality of nipples 100 formed in its bottom portion with each such nipple 100 having a semi-permeable membrane (not shown) therewithin, as best described in copending application Ser. No. 317,653, aforesaid. The nature of the membranes is such that when exposed to water in the fifth chamber 64 it will permit such water to diffuse therethrough into the container 96 at a controlled rate to form a citric acid solution and permit the citric acid solution to diffuse back through the membranes at a controlled rate so as to control the acidity or pH of the water in the fourth chamber 60. The fifth chamber 64 is sealed off from the forward housing portion 94 of the unit 44 by a partition wall 102 having an opening 104 therein (FIG. 2) which communicates with the fourth chamber 60 whereby the citric acid solution diffusing back through said membranes may reach the fourth chamber 60.

As best seen in FIGS. 2 and 3, the chambers 46, 48, 52, and 60 are formed between the partition wall 102 and a spaced, parallel outer wall 106. The second chamber 48 is defined by the partition wall 102, the outer wall 106, an end wall 108, and the partition wall 50. The first chamber 46 is defined by the partition wall 102, the outer wall 106, the partition 50, and a partition 110. The boiler chamber or third chamber 52 is defined by the partitions 62 and 110 and the walls 102 and 106 and communicates with the first chamber 46, as will be apparent infra. The fourth chamber 60 is defined by the partition 62, the partition wall 102, the outer wall 106, and an end wall 112.

A plurality of open channels are formed integral with the outer face of the wall 106 and are seen to include the cold water supply channel 114, a distilland supply channel 116, a product water channel 118, a cold water supply channel 120 for the first chamber 46, a cold water overflow channel 122 for the second chamber 48, a cold water supply channel 124, and a blow-down channel 126. The distilland supply channel 116 is provided with an opening 128 which communicates with the fourth chamber 60 to permit heated and treated distilland to flow from the chamber 60 into the channel 116. Similarly, the cold water supply channel 124 is provided with openings 132 and 130 which communicate with the first chamber 46 and the third or boiler chamber 52, respectively, to permit the cold feed water to enter the boiler chamber 52. The cold water supply channel 120 is provided with an opening 134 which communicates with the first chamber 46 whereby cold supply water from the channel 120 may be introduced into said first chamber 46. In a like manner, the overflow channel 122 is provided with an opening 136 which communicates with the overflow or second chamber 48 to permit cold water in said chamber 48 to enter said overflow channel 122.

A cover assembly 138 is adapted to mate with the outer wall 106 and includes an inner face 140 having a plurality of open channels formed therein conforming exactly to and in mirror image of the channels formed in the outer wall 106. The channels formed in the inner in the face 140 have been identified by the same reference numerals used for the channels in the wall 106 save that the channels in the face 140 are distinguished from those in the wall 106 by the notation "prime" ('). The cover assembly 138 is provided with a plurality of fluid conveying openings or ports extending therethrough including a pair of ports 142 and 143 extending into channel 126' for conveying blowdown, a port 144 extending into the channel 122' receiving overflow brine from the second chamber 48, a pair of ports 146 and 147 extending in to channel 114' with port 147 receiving cold water supply and port 146 delivering into still 42 via 176, a port 150 extending into channel 120' receiving cord feed from 178 and delivering into the first chamber 46, and three ports in channel 118!, ports 152 and 154 each receiving distilled product from still 42 and conveying it via port 151 to manifold 200 and storage in 78.

The cover assembly 138 is further provided with a cylindrical boss 156 on its inner face 140 having a cylindrical aligning hole 158 extending therethrough and is further provided with an oblate cylindrical boss 160 having an elongated slot 162 extending therethrough at said interface 140.

The spaced outer wall 106 of the device 44 is provided within a pair of alignment pins 164 and 166 which are adapted to be received within the openings 158 and 162 in the cover assembly 138 whereby the cover assembly 138 may be mounted over the spaced outer wall 106 with the corresponding open channels in said wall 106 and said face 140 in registration. The elongated slot 162 permits some leeway in mounting the cover assembly 138 on the wall 106 to permit for manufacturing tolerances.

The combination distilland treatment device 44 and its cover assembly 138 are constructed of a suitable plastic material (e.g., polysulfone) such that the cover assembly 138 may be sonically welded to the wall 106 such that the corresponding open channels on the wall 106 and the inner face 140 will seal together to form enclosed channels or conduits for conducting fluid and which will be identified hereinafter by the reference numerals used to indicate the corresponding open channels in the wall 106.

As best illustrated in FIG. 2, the inner face 168 of the still 42 is provided with a plurality of nipples 170, 172, 174, 176, 178, and 180 which function as entrance and exit ports for the various fluids flowing to and from the still 42, as described hereinafter. The still 42 is adapted to be mounted over the cover assembly 138 with the nipple 170 being received within the port 142 so as to communicate with the channel 126. The nipples 172 and 174 are received within the ports 154 and 152, respectively, and communicate with the channel 118, while the nipple 176 is received within the port 146 and communicates with the channel 114. Similarly, the nipple 178 is received within the port 150 so as to communicate with the channel 120 and the nipple 180 is received within the port 148 so as to communicate with the channel 116.

The still 42 is removably secured over the cover assembly 138 by means of a hinged cover assembly 182. The hinged cover assembly 182 is adapted to snugly fit over the still 42 and is provided with a pair of aligned, spaced tab portions 184 and 186 which are adapted to resiliently fit over the lateral surfaces of the still 42. The hinged cover assembly 182 is provided with a pair of spaced, depending hinge members 188 and 190 which are adapted to mount on a pair of spaced, depending pin members 192 and 194, respectively, on the lower edge of the cover assembly 138, whereby the cover assembly 182 may be articulately connected to the cover assembly 138.

The hinged cover assembly 182 is further provided with a resilient snap tab 196 on its upper edge which is adapted to releasably engage a mating tab 198 on the upper edge of the cover assembly 138 whereby the cover assembly 182 may be pivoted about the pins 192 and 194 to releasably secure the still 42 to the device 44 between said cover assemblies 138 and 182.

Figure 4:
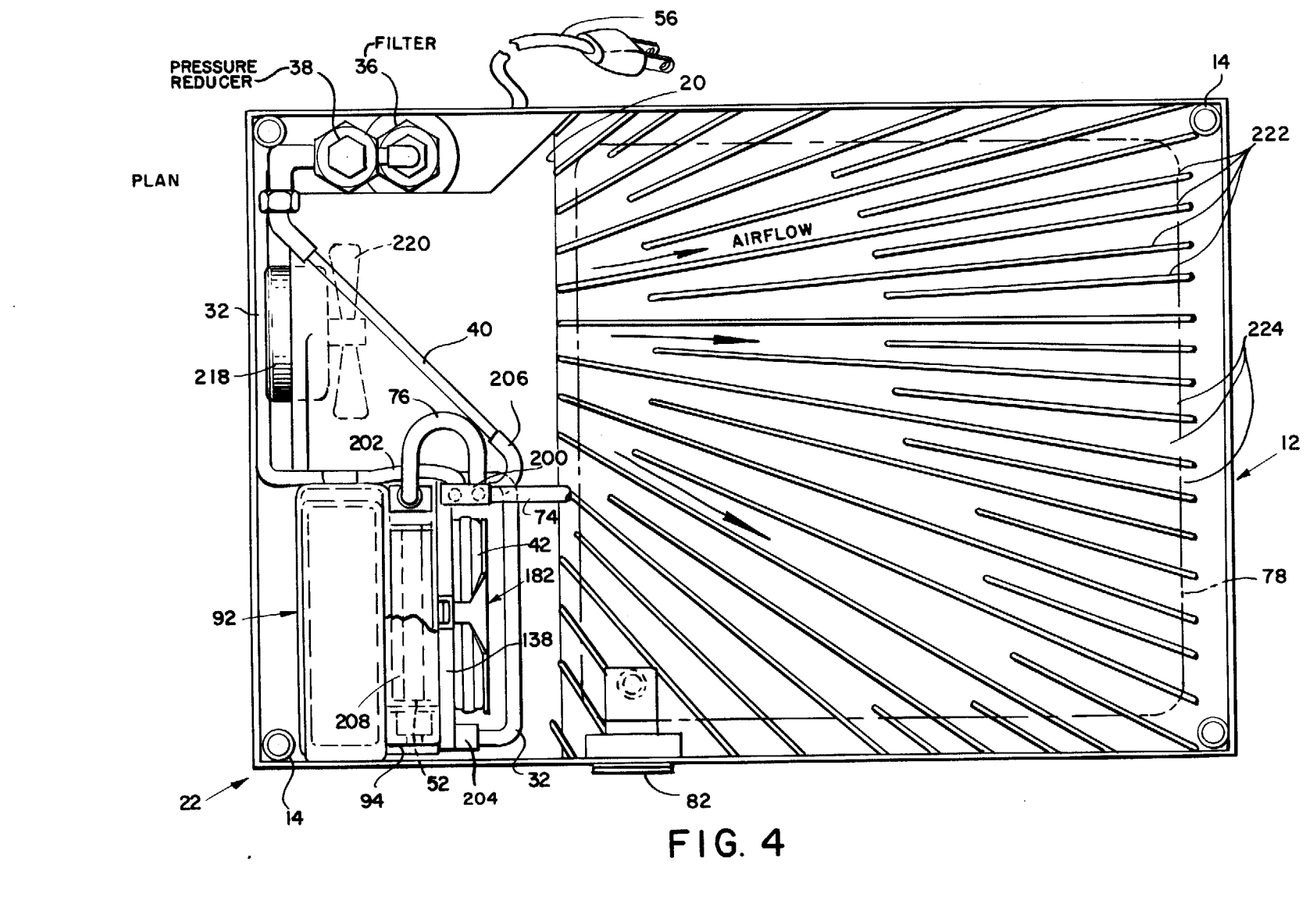
FIG. 4 provides a diagrammatic plan of the apparatus of FIG. 1 with the cover portion removed.
Figure 6:
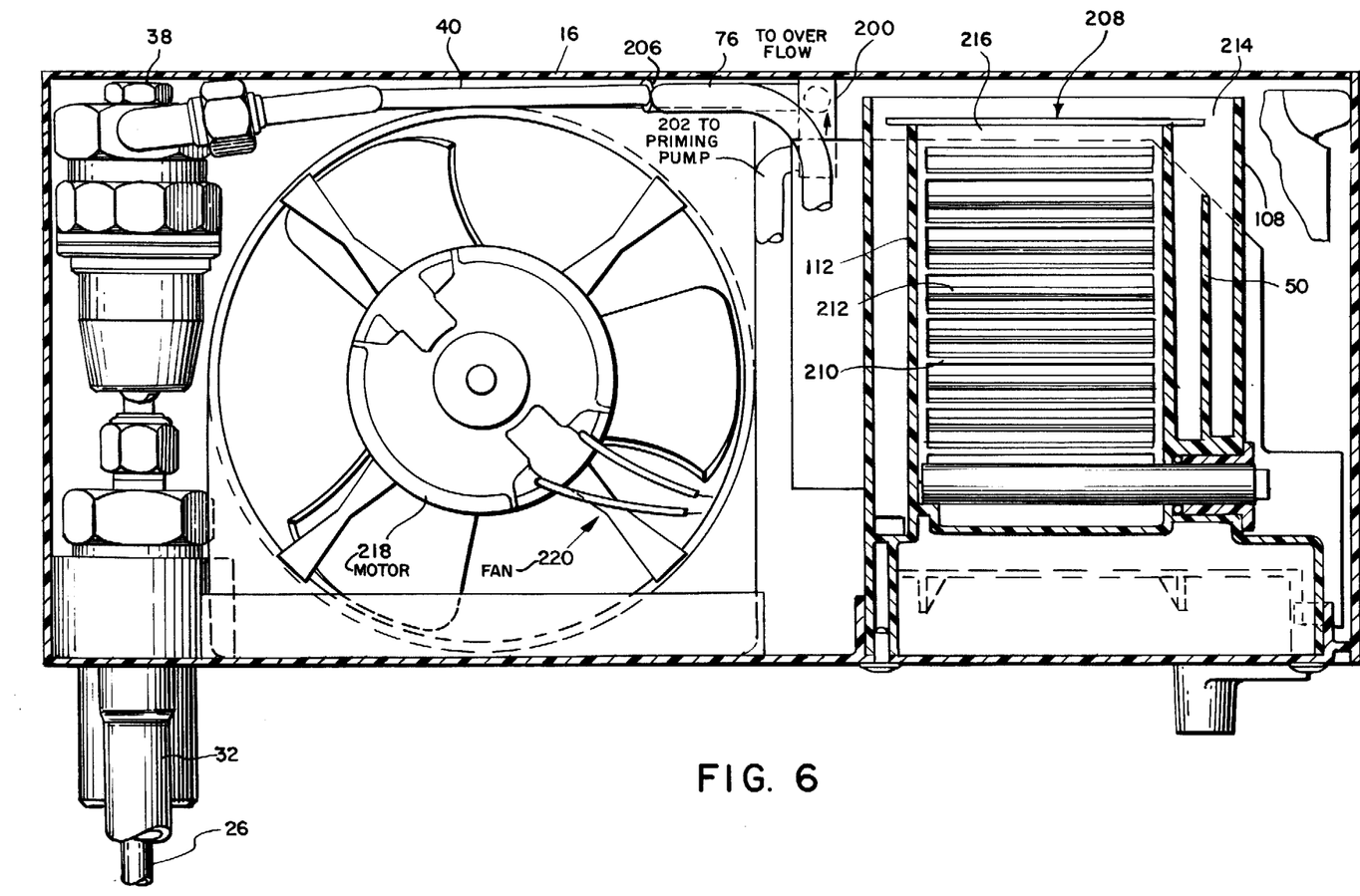
FIG. 6 provides a partial side elevation of the apparatus of FIG. 1 with a portion of the housing broken away and with a portion of the distilland treatment device broken away to reveal the baffle structure incorporated therein.

As best seen in FIGS. 4, 5, and 6, the combination distilland treatment device 44 (with the still 42 affixed thereto, as described hereinabove) is disposed within the forward portion of the processing area 22 within the housing 12 of the distillation system 10. A manifold 200 is connected to the cover assembly 138 so as to communicate with the channel 118 via the port 151. Product water from the still 42 enters the channel 118 via the nipples 172 and 174 thru orifices 152 and 154 and then is conducted through the channel 118' to the manifold 200. The product water conduits 66, 74 and 76 (FIG. 2) together with a conduit 202, to the priming pump 72, are connected to the manifold 200 which incorporates the check valves 68 and 70 (FIG. 2) therein. Thus, product water emanating from the nipples 172 and 174 of the still 42 is conducted to the manifold 200 from which it enters the conduits 74, 76, and 202, as described in more detail hereinafter.

A second manifold 204 is connected to the cover assembly 138 so as to communicate with the channels 122 and 126 via the ports 144 and 143, respectively. The channel 122 communicates with the second or overflow chamber 48 (of the device 44) via the opening or port 136 and the channel 126 receives the effluent or blow-down emanating from the nipple 170 of the still 42 which enters said channel 126 via the port 142. The manifold 204 is connected to the common drain 32 and functions as the blow-down discharge conduit 86 as well as constituting a portion of the drain 32. Additionally, the manifold 204 may include the blow-down flow control valve 88 and the check valve 90 (of FIG. 2) therewithin. The fine screen filter 36 and the single-stage pressure reducer 38 are situated within the rear portion of the processing area 22 within the housing 12 and communicate with the cold water supply nipple 176 of the still 42 via the port 147 and the channel 114 by means of a connecting line 206 which extends between the flow control valve 40 and the port 147 (which communicates through the channel 114 with the nipple 176 which receives the cold water supply from the supply line 30).

As best seen in Flg. 3, the port 141 is situated a predetermined distance above the port 148 (which is itself situated at the liquid level in the boiler determined by the partition 50) such that the pressure head of the impure heated and treated feed water will be less than that of the potable product water. Maintaining the pressure head of the product water or distillate above that of the distilland will prevent the impure feed water from entering the storage container 78 upon any failure of the microporous membranes within the still 42 in accordance with the teachings of U.S. Pat. No. 3,406,096, issued on Oct. 15, 1968, and commonly assigned herewith.

In consequence of the foregoing, the product conduits 74 and 76 are situate above the connecting line 206 which supplies cold supply water to the device 44.

As best seen in FIGS. 4, 5, and 6, a baffle network 208 is disposed within the boiler chamber 52 of the device 44 and, as more fully described in application Ser. No. 317,622, aforesaid, comprises a plurality of alternating aligned baffles 210 and 212 which are canted slightly upward and function to provide a tortuous path for steam bubbles rising in the chamber 52 such that the bubbles are broken up into smaller size, whereby non-condensible gases such as air can be more readily stripped from the feed water being heated in the boiler chamber 52. The upper portion of the baffle network 208 covers the chambers 46, 52, and 60 and extends from slightly beyond the end wall 112 to a point over the partition 50 so as to leave an opening 214 (FIG. 6) between the end wall 108 and one end of the top of the baffle network 208 which functions to vent the unit 44. Further, the upper portion of the baffle network 208 is configured to define a passageway 216 whereby steam and other gases from the boiler 52 may be vented to the ambient atmosphere via the opening 214.

A motor 218 is disposed within the rear portion of the processing area 22 and receives electrical power from the same cord and plug assembly 56 which supplies energy to the heating element 54 and the control network 58. The motor 218 is connected to a fan assembly 220 which circulates air in the processing area 22 to aid in dissipating gases vented from the device 44 and further performs a cooling function for the stored product water, as will be described in more detail hereinafter.

As best seen in FIG. 4, a plurality of vanes 222 are disposed along the bottom portion of the product storage area 24 of the housing 12 and support the product storage bag 78. The vanes 222 are of sufficient height above the bottom of the storage area 24 and extend radially outward from the fan assembly 220 so as to define a plurality of air passages 224 under the product storage bag 78.

It should be emphasized at this point that the product storage bag 78 is formed of any suitable flexible plastic material that is vapor and liquid impermeable, but the bottom surface 300 of the bag (FIG. 2), that rests on the vanes 222, comprises a porous material such as polyvinylidene fluoride capable of being permeated by water vapor but being impermeable to the liquid water. Thus, the product water stored in the bag 78 may evaporate through the lower surface 300 of such bag 78 thereby cooling the stored product water. Air from the motor-driven fan assembly 218–220 will circulate through the air passages 224 to increase the rate at which water vapor is permitted to evaporate through the bottom of the storage bag 78 to enhance the cooling of the product water.

Reiterating the operation of the subject invention, it is seen that upon connection of the line piercing valve 28 to the cold water supply line 30, the line piercing valve 28 may be opened to permit cold water to flow to the fine screen filter 36 which will remove the larger particles from the supply water and the filtered supply water will pass through the pressure reducer 38 which, in turn, will permit the filtered and pressure regulated cold water supply to be fed to the flow control valve 40 which, in turn, will regulate the flow of the cold water supply to the still 42. The filtered, pressure regulated, and flow regulated supply will enter the still 42 via the connecting line 206 (FIG. 4), the manifold 200, the port 147, the channel 114, and the nipple 176. The cold water supply will flow through the still 42 where it will function to cool and indirectly condense the distilled product water while being shielded from contact therewith and will exit from the still 42 via the nipple 178, through the port 150, into the channel 120. The cold water in the channel 120 will enter the first chamber 46 of the combination boiler-deaerator and water treatment device 44 (FIG. 3) via the opening 134 in the wall 106.

The first chamber 46 will fill with the cold supply water to a level at which water begins to spill over the partition 50 into the second chamber 48 and the overflow cold water supply in the chamber 48 will exit therefrom via the opening 136 into the channel 122 which communicates with the second manifold 204 via the port 144. It will be recalled that the manifold 204 is connected to the drain line 32 which, in turn, may be connected to the household drain line and, thus, the overflow cold water supply is drained away from the overflow chamber 48.

The cold water supply in the chamber 46 is permitted to exit therefrom via the opening 132 into the channel 124 and thence through the opening 130 into the boiler chamber 52 where it is heated and deaerated. The heated and deaerated supply from the boiler chamber 52 overflows the partition 62.

It should be emphasized at this point that the user will have determined the pH of the cold water supply from the line 30 as by means of suitable indicating means, such as litmus paper, and will have determined the degree to which the pH should be altered to prevent scale formation in the unit. Accordingly, the user will have opened the appropriate number of nipples 100 on the solute container 96, of the metering mechanism 65, to control the rate at which the pH of the heated feed water or distilland in the chamber 60 will be altered. The heated distilland in the chamber 60 communicates with the solute in the container 64 via the opening 104 between the chamber 60 (FIG. 2) and the fifth chamber 64 (FIG. 3) and the open nipples 100, as described hereinabove.

The heated, deaerated, and pH controlled feed water from the chamber 60 will exit therefrom via the opening 128 and flow through the channel 116 to the nipple 180, in the port 148, which serves as the entrance to the still 42 for the heated and treated distilland. The distilland entering the still 42 from the nipple 180 will be fed simultaneously to the multi-stages thereof and will flow on one side of successive microporous membranes, through which its vapor will pass and be indirectly condensed by the cold supply water circulating through the still 42, as aforesaid. It should be emphasized that the heated distilland and the cooled product water are isolated by the microporous membrane in any individual stage and by non-porous barrier membranes between successive stages.

In order to commence efficient operation, the operator will pull on the priming pump 72 one or more times in order to draw suction through the line 202 (FIG. 4), the manifold 200, and consequently the product water conduit means 66 which is formed by the manifold 200 and the channel 118. Suction drawn through the conduit means 66 will open the check valve 70 and draw any air out of the pores of the microporous membranes within the still structure 42 and also remove air from the product water passages within the still structure 42. Air in the feed water channels in the still structure 42 will also be drawn through the pores of the microporous membrane causing the distilland to contact one side of the microporous membranes of each of the stages of the still 42 so that the vapor of the distilland may more efficiently diffuse through the microporous membranes and be condensed as potable water on the product water side of the membranes whereupon the potable product water may be withdrawn from the still 42 via the nipples 172 and 174 for subsequent delivery to the storage bag 78 via the channel 118, the port 151, the manifold assembly 200, and the conduit 74.

It should be noted at this point that, in accordance with the teachings of said U.S. patent application Ser. No. 80,570, of Franklin A. Rodgers, where the microporous membranes of the still 42 are so constructed that the maximum "effective pore diameter" EPD (the diameter of a circular pore which functions equivalently) does not exceed the value $$EPD = \frac{4\gamma \cos(\ )}{\Delta P}$$

with: $\gamma$ = surface tension of the vaporizable distilland; $\theta$ = the angle of contact at the liquid-gas-membrane interface; and $\Delta P$ = the differential between the absolute pressure of the gas within the pores and the absolute hydrostatic pressure of the higher of the hydrostatic pressures of the distilland and distillate liquids on opposite sides of the microporous membrane; then the "displacement pressure" of the membrane (that pressure across the membrane which will cause liquid water to pass therethrough) will not be exceeded if the "effective pore diameter" is made sufficiently small and the membrane pores may be evacuated without any consequent liquid distilland or distillate filling of such pores.

The priming pump 72 is vented by a check valve 226 which closes when the priming pump is actuated to draw suction as does the check valve 68 within the manifold 200. Subsequent depression of the priming pump 72 will close the check valve 70 and open the check valve 226 to permit the priming pump to discharge. When product water starts to flow through the conduit 66, the priming pump 72 should be depressed or closed to prevent product water from flowing through the check valve 70 into the priming pump 72 and out the vent of the priming pump 72 via the check valve 226.

With the priming pump 72 closed, product water will quickly fill the connecting line 202 and thereafter the product water will open the check valve 68 and flow to the product storage bag 78 via the product water conduit 74. Product water in the storage bag 78 will evaporate slowly through the porous membrane constituting the lower surface of the storage bag 78 into the air passages 224 in the bottom of the product storage area 24 where they will be vented away by the air current generated by the motor-driven fan assembly 218–220 to increase the rate at which the product water in the storage bag 78 is cooled. Thereafter, potable product water may be withdrawn from the storage bag 78 by means of the spigot 82 and the product output line 34. Any excess product water may be fed via the conduit 76 to the surplus product storage container 84 which may be placed either within or without the product storage area 24 of the housing 12. After the heated and treated distilland flowing through the still 42 has yielded the potable product water or distillate, it is conducted out of the still via the nipple 170 and into the channel 126, via the port 142, from whence it exits via the port 143 into the manifold 204 from whence, together with the cold water supply overflow from the chamber 48, it enters the common drain 32.

It can readily be seen that many other variations and modifications of the present invention are possible in the light of the aforementioned teachings, and it will be apparent to those skilled in the art that various changes in form and in arrangement of components may be made to suit requirements without departing from the spirit and scope of the invention. It is, therefore, to be understood that within the scope of the appended claims, the instant invention may be practised in a manner otherwise than is specifically described herein.

What is claimed is:

1. A distillation system for use with a disposable multi-stage still of the type comprising alternating vapor permeable and impermeable membranes in laminar relation for receiving distilland on one side of each of said permeable membranes and condensing distillate on the other side of each of said permeable membranes due to a differential temperature maintained across each of said permeable membranes; said system including:

means for connection to a supply of distilland liquid and to said still for conducting said distilland liquid to said still to be preheated therein by acting as indirect coolant for condensation of vapor;

means for further heating said preheated distilland and means for removing any non-condensible gases therefrom;

means for conducting said supply of preheated distilland liquid from said still to said further heating means;

means for conducting said further heated distilland as liquid from said heating means back to said still in part to be vaporized therein to produce vapor passing through said membranes for condensation as distillate;

means for draining said resulting concentrated distilland from said still;

distillate storage means, said storage means comprising a container at least a portion of which is adapted to permit vapor of said distillate to diffuse therethrough;

distillate cooling means comprising means for circulating air over that portion of said storage means adapted to permit diffusion of said distillate vapor;

means for maintaining the hydrostatic pressure of said distillate on one side of each of said permeable membranes at least as high as that of said distilland on the other side of each of said permeable membranes to prevent pollution of said distillate in said storing means upon failure of said permeable membranes filtering means connected to said distilland supply conducting means for filtering out impurities from said distilland prior to the entry thereof into said still;

means for regulating the pressure and flow rate of said distilland in said distilland supply conducting means;

means for conducting distillate from said still to said distillate storage means;

means for withdrawing said distillate from said storage means; and priming means connected to said distillate conducting means for initiating the operation of said system, said priming means including means for at least partially evacuating said distillate conducting means; and means for drawing suction on said distilland through said permeable membranes to draw said distilland into contact with one side of said permeable membranes.

2. The invention in accordance with claim 1, wherein said priming means comprises a pump and further including means for venting said priming means.

3. The invention as recited in claim 1, further including first check valve means connected to said distillate conducting means between said still and said priming means to prevent distillate from flowing from said priming means to said still.

4. The invention as stated in claim 3, further including second check valve means connected to said distillate conducting means between said still and said storage means for preventing the flow off distillate from said storage means to said still.

5. The invention as related in claim 4, additionally including third valve means connected to said distilland draining means for preventing the flow of distilland through said draining means towards said still.

6. A compact water purification system for home use with a sink having cold water supply and drain lines, said system operable in conjunction with a disposable still incorporating multiple distillation stages each including a porous membrane permeable by water vapor and impermeable to liquid water for separating distilland and distillate water, said system including:

a housing having a processing area in which said still is located and a product storage area;

a first line connected to said housing for conducting cold supply water thereto;

means connected to said first line and adapted to be connected to said cold water supply line for opening and closing the flow of cold water through said supply line and said first line;

means connected to said first line for conducting said cold supply water to said still to be preheated therein by acting as indirect coolant for condensation of vapor;

means for further heating and means for deaerating at least a portion of said preheated supply water;

means for conducting at least a portion of said further heated supply water from said still to said further heating means and said deaerating means;

means for conducting said further heated and deaerated supply water from said further heating and deaerating means back to said still whereby the vapor of said heated and deaerated supply water may pass through said membranes and be condensed as potable distillate;

means for conducting resultant concentrated supply water from said still to said drain line;

means disposed within said product storage area for receiving and storing potable distillate from said still;

means for cooling said distillate stored in said distillate storing means;

means for withdrawing potable distillate from said storing means;

means for priming said system to facilitate the initiation of operation of said still, said priming means including pump means for drawing suction through said means for conducting distillate from said still to said storage means for withdrawing any noncondensible gases from the pores of said porous membranes, said priming means further including means for closing said conducting means to said storing means and said conducting means to said drain line upon actuation of said priming means to isolate said storing means and said drain line from said still.

7. The invention as delineated in claim 6, wherein said distillate cooling means includes motor-driven fan means disposed within said processing area.

8. The invention as related in claim 7, wherein said storing means comprises a container at least a portion of the surface of which comprises a porous material adapted to permit distillate vapor to pass therethrough while preventing the passage of liquid distillate therethorugh.

9. The invention according to claim 8, wherein said storage means' porous surface is disposed on the lowermost surface thereof and further including means disposed within said product storage area for supporting said storage means so as to define a plurality of air channels through which air from said motor-driven fan means may be circulated to enhance the cooling of the distillate in said storage means by increasing the evaporation rate of distillate through said storage means' porous surface.

10. The invention as set forth in claim 9, further including means for filtering said cold water supply prior to reaching said still; means for regulating the pressure of said cold water supply reaching said still; and means controlling the flow rate of cold water supply to said still.

11. The invention as set out in claim 10, wherein said means for conducting said heated and deaerated supply water to said drain line includes a second line connected to said housing and wherein said means for withdrawing potable distillate from said storing means includes a third line connected to said housing and extending to a spigot or the like.

12. The invention as stated in claim 11, further including means for controlling the pH of the heated and deaerated supply water.

13. The invention as delineated in claim 12, wherein said pH controlling means includes means for providing a regulated flow of predetermined solute to said heated and deaerated supply within said heating and deaerating means.

* * * * *